July 11, 1961 W. J. TELL ET AL 2,992,035
EXHAUST THROUGH REAR BUMPER
Original Filed Dec. 6, 1951 2 Sheets-Sheet 1

INVENTORS
William J. Tell &
Peter Zerhan, Jr.
Willits, Helwig & Baillie
ATTORNEYS July 11, 1961 W. J. TELL ET AL 2,992,035
EXHAUST THROUGH REAR BUMPER
Original Filed Dec. 6, 1951 2 Sheets-Sheet 2

INVENTORS
William J. Tell &
Peter Zerhan, Jr.
Willits, Helwig & Baillio
ATTORNEYS

United States Patent Office 2,992,035
Patented July 11, 1961

2,992,035
EXHAUST THROUGH REAR BUMPER
William J. Tell, 6501 Tripp Road, R.R. 1, Holly, Mich., and Peter Zerhan, Jr., 1914 Byrd St., Dearborn, Mich.
Continuation of abandoned application Ser. No. 260,131, Dec. 6, 1951. This application Jan. 26, 1956, Ser. No. 561,538
6 Claims. (Cl. 293—69)

This is a continuation application of S.N. 260,131 filed December 6, 1951, now abandoned, in the names of William J. Tell and Peter Zerhan, Jr.

This invention relates to exhaust apparatus for motor vehicles and has particular relation to apparatus for discharging the exhaust gas from the engine of a motor vehicle through one or more openings formed in the rear bumper of the motor vehicle.

It is now the practice in the construction of motor vehicles to have the exhaust pipe or pipes conduct the exhaust gas to the rear end of the vehicle where the gas is discharged below and somewhat to the rear of the bumper and other parts of the vehicle. This necessitates positioning exhaust pipes in such low positions that they are not only unsightly in appearance but tend to become damaged as a result of exposure to the effects of weather and to objects that hit the pipes during the operation of the vehicle over rough terrain.

It has been proposed to project exhaust pipes through various parts of the vehicle body above the lower extremities of these various parts of the body but this has not proven satisfactory heretofore because exhaust gas tends to discolor and damage the parts and exhaust pipes tend to transmit vibrations to the body which result in objectionable rumbling noises.

It is now proposed to project the exhaust pipes of motor vehicles through the rear bumper of the vehicle and to provide attaching and supporting means therefor that will not only prevent the transmission of sound to the vehicle body but will prevent discloration and damage to the bumper and other parts of the vehicle.

In the drawings:

FIGURE 5 is taken substantially in the plane of line 5—5 on FIGURE 3 looking in the direction of the arrows thereon.

Figure 1:
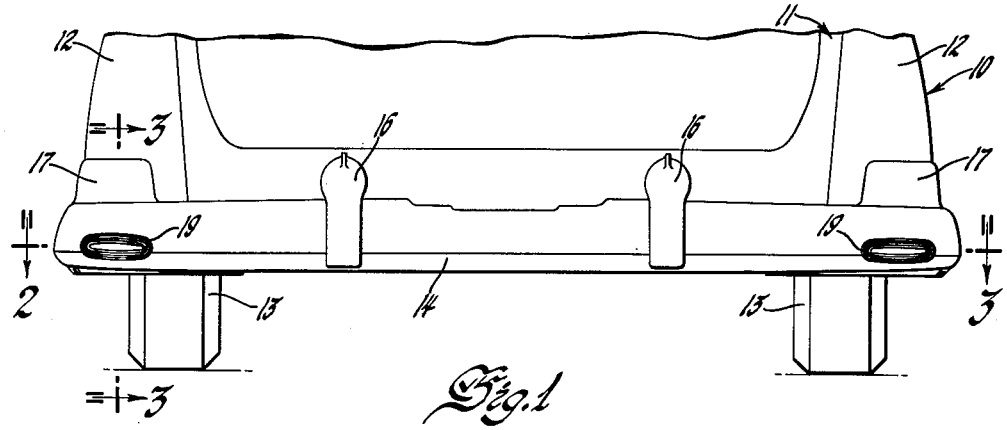
FIGURE 1 is a fragmentary rear end elevational view of a motor vehicle having engine exhaust apparatus embracing the principles of the invention.
Figure 2:
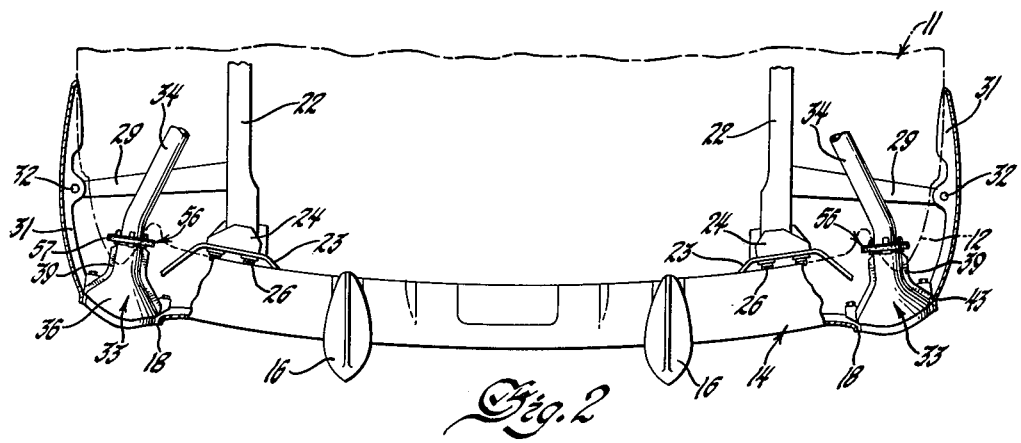
FIGURE 2 is a horizontal sectional view taken substantially in the plane of line 2—2 of FIGURE 1, with certain parts of the vehicle body shown in outline by dot-and-dash lines.
Figure 3:
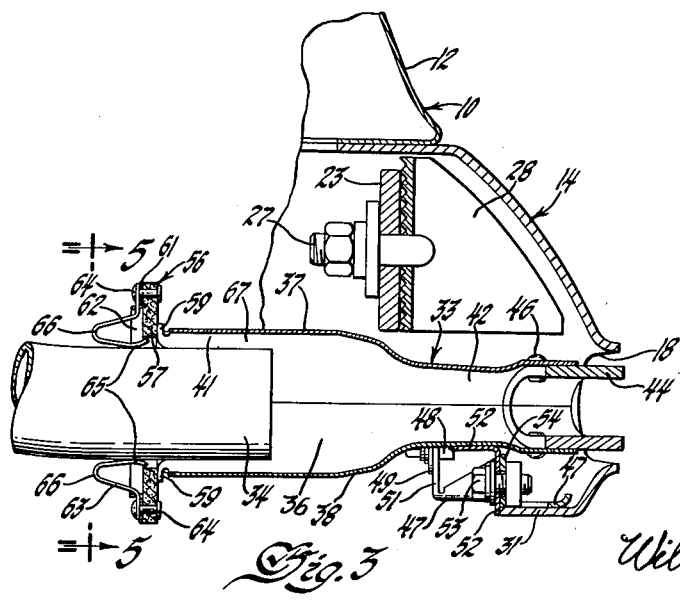
FIGURE 3 is a vertical sectional view of a part of the vehicle body illustrated in FIGURE 1 and taken substantially in the plane of line 3—3 on FIGURE 1.

The motor vehicle 10 illustrated by the various figures of the drawing comprises a body 11 having rear fenders 12 and supported by rear wheels indicated at 13. The rear end of the body 11 and the fenders 12 are protected by a rear bumper 14 which extends transversely across the rear end of the body 11 at the lower extremity thereof. The bumper 14 may be bent adjacent the opposite ends thereof in such a way that the ends of the bumper project forwardly of the body for the purpose of protecting the outer parts of the rear fenders thereof. The bumper 14 also may be provided with spaced bumper guards 16 which are located in spaced relation to one another and somewhat within the ends of the bumper. The bumper 14 also may be provided with upwardly projecting bumper guards 17 adjacent the bent ends thereof for the purpose of better protecting the rear ends of the fenders 12.

One or more exhaust conduit openings 18 are formed to provide exhaust passages extending transversely through the rear bumper 14 at any desired location. However, in the present instance it is considered preferable to locate one of the openings 18 adjacent each end of the bumper 14 and at the rear part of the bend in the bumper where the ends project forwardly around the rear ends of the fenders 12. The openings 18 as illustrated also are located behind the rear extremities of the fenders 12. It is preferred to have the openings 18 formed as elongated openings with the major axes thereof in the same horizontal plane. In forming the openings 18 it is preferred to curve the material of the bumper outwardly slightly so as to form slight flanges 19 around the openings. This curves the interior surface of the bumper adjacent the openings 18 in such a way as to facilitate flow of air through the openings. Also the flanges 19 can be cut off and finished at the ends in such a way as to form annular surfaces around the openings that will improve the appearance of the bumper adjacent the openings.

Figure 4:
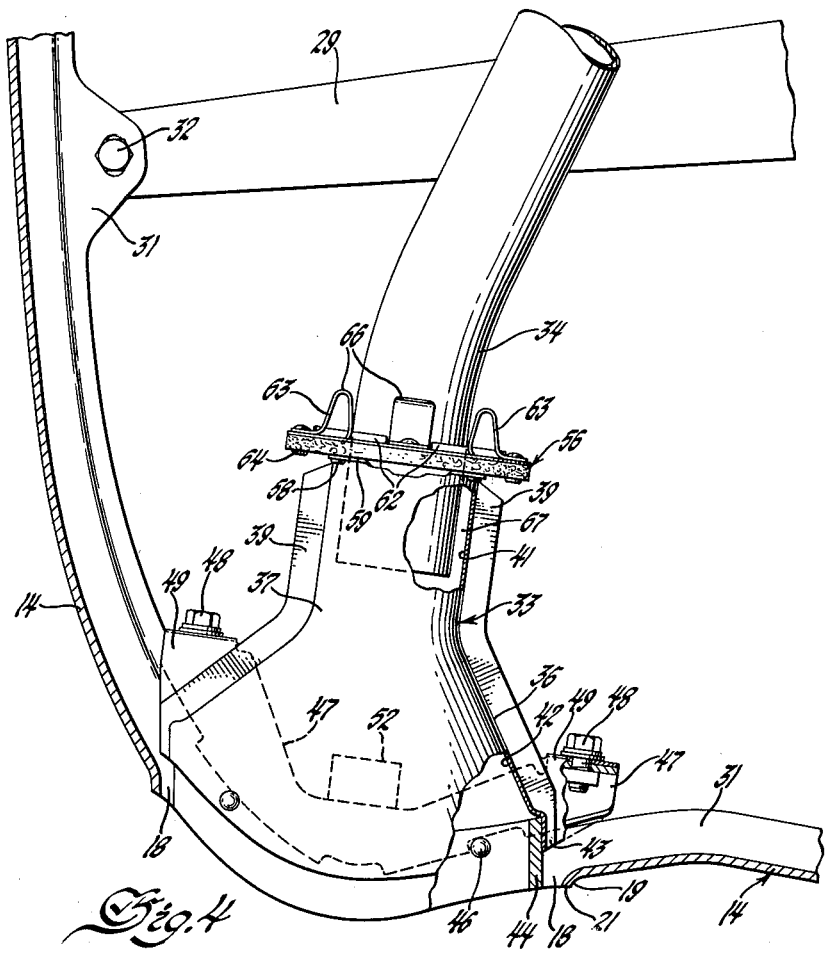
FIGURE 4 is a fragmentary enlarged view of one end of the structure illustrated by FIGURE 2.
Figure 5:
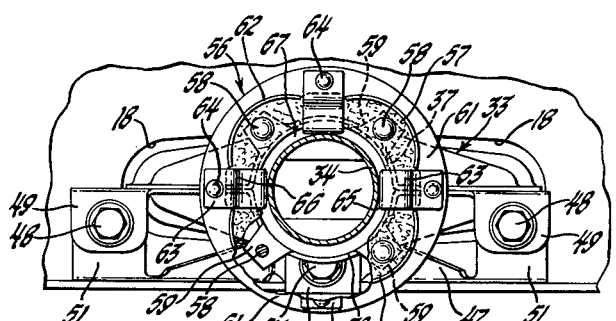
FIGURE 5 is a vertiical sectional view of the structure as illustrated by FIGURE 3.

The bumper 14 is supported at the rear ends of the body sills 22 by brackets 23 which are secured by bolts indicated at 26 to the ends of the sills upon mounting plates 24. The ends of the brackets 23 are secured by bolts 27 to mounting brackets 28 which are welded to the inner surfaces of the bumper 14. The bumper 14 also is secured to the sills 22 adjacent the ends thereof which project forwardly around the rear fenders 12. Bars 29, the ends of which are secured by bolts 32 to the flange 31 which extends around the lower edge of the bumper 14 are employed for this purpose. The opposite ends of the bars 29 are removably secured by bolts or other suitable means to the lower flanges of the sills 22. Exhaust conduit means 33, including exhaust pipes 34 and exhaust shells or receivers 36 are adapted to discharge the exhaust gas from the engine of the vehicle through the openings 18 and behind the bumper 14. The receiver 36 includes a pair of stampings 37 and 38 having outwardly flanged edges 39 that are adapted to be welded or otherwise secured together to provide cylindrical passages 41 at the rear ends thereof and outwardly tapering passages 42 extending toward the openings 18. The outer extremities of the shells or receivers 36 are formed in such a way as to provide cylindrical flanges 43 within which rings 44 are riveted or otherwise secured at 46. The rings 44 form cylindrical walls at the rear ends of the exhaust conduit means 33, the outer surfaces of these wall being spaced inwardly with respect to the edges of the bumper 14 surrounding the openings 18 to provide annular openings 18 therebetween. The annular openings 18 are of approximately the same width all around the outer surfaces of the rings 44. It will be noted from FIGURE 4 that the rear edges of the rings 44 form annular rings that follow approximately the contour of the edges 21 of the bumper that surround the openings 18. It is proposed to finish the interior, exterior and outer edge surfaces of the rings 44 with the finish employed on the exterior surfaces of the bumper 14. The shells or receivers 36 projecting within the openings 18 are adapted to be rigidly supported upon the bumper 14 by brackets indicated at 47. The opposite ends of the brackets 47 are formed to provide ears 51 that are secured by bolts 48 to ears 49 that project outwardly and downwardly from the flanges 39 of the lower part 38 of the two-piece shell 36. The shells 36 also are secured to the brackets 47 by angle brackets 52 which are welded or otherwise secured to the middle parts of the lower parts 38 of the shells 36. The angle brackets 52 are secured by bolts 53 to the upwardly bent central parts of the brackets 47 which form flanges indicated at 54.

The exhaust pipes 34 are secured within the forward ends of the shells 33 by flexible resilient sound absorbing, and heat insulating couplings or hangers indicated at 56. The hangers 56 comprise annular rings 57 which are secured by rivets 58 to outwardly bent flanges 59 two of which are formed at the ends of each of the parts 37 and 38 of the shells 36. The annular rings 57 preferably are cut out of old tire casing material or other suitable and inexpensive resilient and flexible material capable of absorbing sound waves that might otherwise be transmitted from the exhaust pipes 34 to the shells 36. The opposite surfaces of the rings 57 support stamped metallic rings 61 adjacent the outer edges thereof. The rings 61 have arcuate flanges 62 formed outwardly around the regions opposite the rivets 58 and the flanges 59 for reenforcing the flexible rings 57 adjacent the outer peripheral edges of the rings 57 but permitting flexibility of the rings 57 within the flanges and in the regions of the rings which surround the rivets 58. The ends of flanges 62 terminate in spaced relation to one another to provide inwardly unobstructed areas to which resilient springs or exhaust pipe supports 63 may be secured by rivets indicated at 64. The rivets 64 extend through the rigid supporting rings 61 and the flexible annular rings 57 and tend to compress the rings 57 so that under all circumstances the springs 63 will be secured rigidly to and will operate as a unit with rings 61. The springs or supports 63 are bent laterally outwardly and inwardly so that the ends 65 thereof project within the rings 57 and terminate in spaced relation to the cylindrical walls 41 of the shells 36 to provide annular passages indicated at 60. The bends 66 formed in the spring 63 are located radially outwardly with respect to the spring ends 65 so that the exhaust pipes 34 can be projected between the springs without engaging the bends 66. The parts of the springs 63 between the bends 66 and the ends 65 will be resiliently bent inwardly by projecting the exhaust pipes between the springs so that the ends of the exhaust pipes will be firmly but resiliently held by the springs within the hangers 57. Exhaust pipes 34 should be projected through the hangers 57 a considerable distance into the shells 33 so that there will be room for outward movement of the exhaust pipes without the ends thereof becoming disengaged from the springs 63 and without being removed from within the ends 41 of the shells 33. However the ends of the exhaust pipes 34 should not extend too far within the shells 33. A considerable distance should be left at the ends of the exhaust pipes 34 so that the inward movement of the bumper 14 as a result of bumps or collisions will not injure the ends of the exhaust pipe 34.

It will be apparent that the exhaust gas from the engine will be discharged into the shells 36 through the exhaust pipes 34. Since the shells 36 are larger than the exhaust pipes 34 and particularly since the shells progressively increase in cross section beyond the ends of the exhaust pipes, it will be apparent that the discharge of exhaust gas into the shells will induce a flow of air into the shells 36 through the annular passages 60. The flow of air through the annular passages 60 will not only prevent the exhaust gas from heating the shells 36; it will mix with the exhaust gas to decrease the velocity of the exhaust gas as it is discharged into the enlarged ends of the shells 36. The exhaust gas and air will be discharged from the shells 36 into the regions beyond the rear surface of the bumper 14. This also will induce a flow of air from the front to the rear of the bumper 14 through the annular openings 18. The air so induced through the openings 18 will provide a fluid sheath around the rear ends of the shells 36 to protect the bumper 14 from the injurious effects of acid and other substances in the exhaust gas and from the injurious effects that might result from the heat of the exhaust gas. The annular rings 57 of the hangers 56 which support the exhaust pipes 34 with respect to the bumper 14 also will absorb vibrations which might otherwise be transmitted from the exhaust pipes to the body of the vehicle. It will be apparent that the entire exhaust conduit system 33 at the rear of the vehicle 11 will be supported in an elevated position with respect to the vehicle, where it will be protected from snow, water, mud, stones, ridges, etc., that now often damage or destroy the exhaust conduit systems at the rear of motor vehicles since the lower parts of the shells 36 slope downwardly toward the front ends thereof it is apparent that any condensate therein will tend to drain toward the front ends of the shells and away from the openings 18.

We claim:

1. A motor vehicle exhaust device comprising a bumper having a bumper wall formed to provide an opening extending transversely therethrough, said bumper having a curvature adjacent said opening and having the space forwardly and rearwardly of said bumper wall freely accessible for the unrestricted circulation of atmospheric air, and exhaust conduit means extending into said opening and having an end terminating in said opening and in axial alignment with said opening and in substantially flush relation to the curvature of said bumper adjacent said opening and in radially inwardly spaced relation to the edge of said bumper wall forming said opening, the space between said end of said exhaust conduit means and said edge of said bumper wall providing an air flow passage around said exhaust conduit means and through said bumper.

2. A motor vehicle exhaust device comprising a bumper having a bumper wall formed to provide an opening and being formed around said opening to provide an outwardly flanged edge, said bumper having the space forwardly and rearwardly of said bumper wall freely accessible for the unrestricted circulation of atmospheric air, and exhaust conduit means having an end extending in axial alignment with said opening and into said opening and terminating in flush relation to said outwardly flanged edge, said end within said opening being disposed in substantially equally spaced relation to said outwardly flanged edge and providing an annular air flow passage through said bumper for circulating air through said bumper and around said exhaust conduit means and from the space forwardly to the space rearwardly of said bumper and responsive to the motion of said vehicle and to the discharge of exhaust gas by said exhaust conduit means.

3. An exhaust apparatus for motor vehicles comprising a bumper adapted to extend transversely across the rear of a vehicle and having openings extending through said bumper adjacent the ends thereof, and exhaust conduit means extending rearwardly along the body of said vehicle and into each of said openings and having ends terminating in alignment with said openings and in flush relation to the exterior surface of said bumper and in inwardly spaced relation to the edges of said bumper forming said openings and providing air flow passages through said bumper openings and around said exhaust conduit means.

4. An exhaust device for motor vehicles comprising, a wall forming a continuous part of the exterior surface of the body of a motor vehicle and being formed to provide an opening, said wall having the space forwardly and rearwardly thereof freely accessible for the unrestricted circulation of atmospheric air, and exhaust conduit means secured to said body and extending along said body toward said wall and having an end supported by said wall and terminating in said opening and in alignment with said opening and in spaced relation to the edge of said wall forming said opening, the space between said end and said edge forming an annular air flow passage through said opening for circulating air through said opening and around said exhaust conduit means and from the space forwardly to the space rearwardly of said wall and responsive to the motion of said vehicle and to the discharge of exhaust gas by said exhaust conduit means.

5. An exhaust device for motor vehicles comprising, a wall forming a continuous part of the exterior surface of the body of a motor vehicle, said wall being formed to extend transversely across said body at the lower extremity of the rear end of said body to provide a bumper impact member for the rear end of said body, said wall being formed to provide a transverse opening for discharging exhaust gas beyond said wall and at the rear of said body, said bumper impact member having the space forwardly and rearwardly of said wall freely accessible for the unrestricted circulation of atmospheric air, and exhaust conduit means secured to said body and extending along said body toward said wall and having an end supported by said body through said wall and terminating in said opening and in alignment with said opening and in spaced relation to the edge of said wall forming said opening, the space between said end and said edge forming an annular air flow passage through said opening for circulating air through said opening and around said exhaust conduit means and from the space forwardly to the space rearwardly of said wall and responsive to the motion of said vehicle and to the discharge of exhaust gas by said exhaust conduit means.

6. An exhaust device for motor vehicles comprising, a wall forming a continuous part of the exterior surface of the body of a motor vehicle, said wall being formed to extend transversely across said body at the lower extremity of the rear end of said body and providing a bumper impact member for the rear end of said body, a transverse opening formed in said wall for discharging exhaust gas beyond said wall and at the rear of said body, exhaust means comprising a first exhaust conduit secured to said body and extending along said body and toward said wall and in alignment with said opening, said exhaust means further comprising a second exhaust conduit including a receiver having a larger passageway than a corresponding length of said first exhaust conduit and being exposed externally to the cooling effect of circulating air in front of said wall resulting from the motion of said vehicle, said exhaust means also including means for providing heat and sound insulating and absorbing and dissipating characteristics, said last means including a first connection between said first and second exhaust conduits and a second connection between said second exhaust conduit and said wall, said first connection including a hanger formed of flexible sound absorbing and heating insulating and vibration absorbing material, means securing said material to said second exhaust conduit, said hanger being annular in formation and being provided with inwardly extending resilient metallic spring fingers that engage and support said first exhaust conduit, said first exhaust conduit projecting through said hanger and into said second exhaust conduit, said second connection including a bracket disposed between said second conduit means and said wall, said bracket being constructed of relatively thin metal conducting heat from said exhaust means to said wall only to an extent less than that required to heat and discolor said wall, said first and second connections providing a critical thermal and vibrational break between said first and second exhaust conduit means and between said second exhaust conduit means and said wall respectively.

References Cited in the file of this patent

UNITED STATES PATENTS

| | | |
|---|---|---|
| 1,110,040 | Chatain | Sept. 8, 1914 |
| 1,217,615 | McDowell | Feb. 27, 1917 |
| 1,813,189 | Moore | July 7, 1931 |
| 1,856,005 | Tomshow | Apr. 26, 1932 |
| 1,942,358 | Grathwol | Jan. 2, 1934 |
| 2,020,054 | Ford | Nov. 5, 1935 |
| 2,097,041 | Powell | Oct. 26, 1937 |
| 2,138,001 | Fluor | June 6, 1939 |
| 2,160,808 | Bradley | June 6, 1939 |
| 2,242,494 | Wolf | May 20, 1941 |
| 2,252,228 | Koch | Aug. 12, 1941 |
| 2,288,158 | Ellinwood | June 30, 1942 |
| 2,290,621 | Riesing | July 21, 1942 |
| 2,318,006 | Mercier | May 4, 1943 |
| 2,324,992 | Riesing | July 20, 1943 |
| 2,489,480 | Chester | Nov. 29, 1949 |
| 2,515,391 | Arbib | July 18, 1950 |
| 2,568,409 | Phillips | Sept. 18, 1951 |
| 2,613,099 | Arbib | Oct. 7, 1952 |

FOREIGN PATENTS

| | | |
|---|---|---|
| 678,688 | Great Britain | Sept. 3, 1952 |

OTHER REFERENCES

Esquire Magazine of August 1951, page 42. (Copy in XD 14–4.6.)